May 5, 1942.   C. E. SWENSON ET AL   2,282,267
TRACTOR HITCH
Filed Dec. 1, 1939
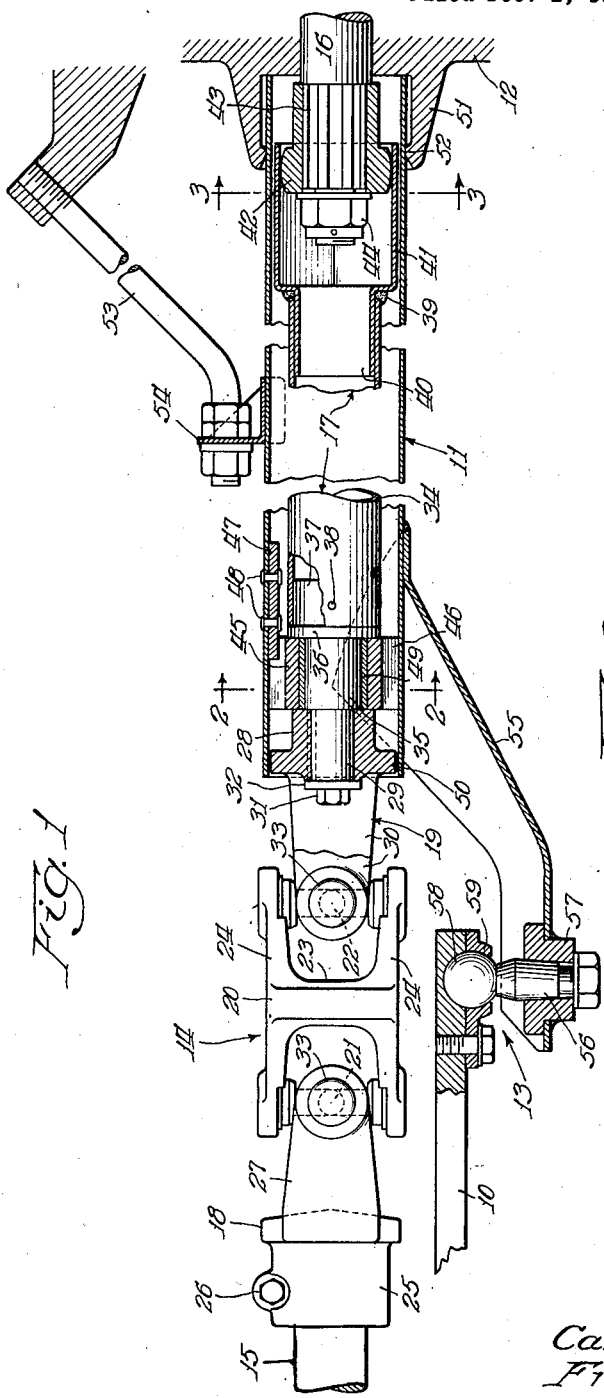
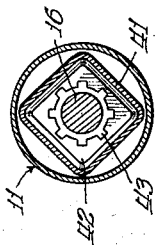
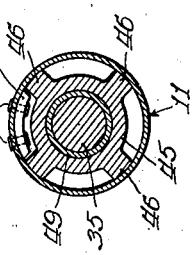
Inventors:
Carl E. Swenson and
Fred M. Potgieter.
By Edward C. Gritzbaugh
Atty.

Patented May 5, 1942

2,282,267

UNITED STATES PATENT OFFICE 2,282,267

TRACTOR HITCH

Carl E. Swenson and Fred M. Potgieter, Rockford, Ill., assignors to Borg-Warner Corporation, Chicago, Ill., a corporation of Illinois Application December 1, 1939, Serial No. 307,070

17 Claims. (Cl. 180—14)

This invention relates to hitches and has as its general object to provide an efficient and durable mechanism for hitching a farm implement or the like to a tractor to be drawn thereby, and for transmitting power from the power takeoff shaft of the tractor to the operating mechanism of the implement.

Specifically, the invention aims to provide an improved form of that type of hitch mechanism wherein the draft is transmitted through a draw bar attached to the tractor and a tongue attached to the implement and pivotally connected at its forward end to the draw bar, and wherein the propelling force is transmitted through a line of propeller shafting forming a continuation of a power take-off shaft projecting from the rear end of the tractor parallel to the longitudinal axis thereof, and articulated by a series of universal joints which permit the angular movement between the tractor and the draft implement which is necessary in order that turns may be properly negotiated.

In the hitches of this type which have been formerly available, it has been common to locate the universal joints at fairly widely spaced intervals along the length of the line of propeller shafting, the object apparently being to avoid excessively sharp bends in the line of shafting at any one point. With such an arrangement, one section of this shafting must swing, relative to the implement tongue, around a pivot which is located considerably to the rear of the pivot between the tongue and tractor draw bar, necessitating the provision of clearance space on either side of such swinging section and requiring considerable telescoping in the shafting.

It is necessary to provide bearing supports for the propeller shafting in the vicinity of the universal joints. Since it would be difficult to provide direct bearing support for the swinging shaft section, it is customary to associate the bearings with those sections of shafting which are not required to make any substantial angular movement relative to the machines to which they are respectively connected, leaving the swinging shaft section to be supported entirely through the medium of universal joints by which it is connected to the other sections. Another object of the present invention is to reduce to a minimum the load which is thus imposed upon the joint by the weight of the swinging shaft section. This is accomplished by completely eliminating the swinging shaft section and employing a double Cardan joint to take the place of the widely separated individual joints of the prior devices.

But an even more serious problem in connection with the bearing support of the propeller shafting, is one that we have discovered to exist generally in connection with the transmission of torque loads through Cardan joints. We have reference to what we have termed "secondary" loads which are imposed upon the supporting bearings or the shaft sections, or on both. These secondary loads arise whenever torque is being transmitted, through a Cardan joint, between two shaft sections which are not in alignment. They are developed at the point of intersection of the shaft axes, and fluctuate from maximum to zero and vice versa throughout each 90° of shaft revolution. They comprise either an alternating load on the bearing or a bending stress in the connection shaft section.

The previous hitch devices have failed to recognize or appreciate this problem of secondary loads. A common method of mounting upon the implement tongue the bearing of the propeller shaft section which is conencted to the implement, has been to support the bearing upon a bracket projecting upwardly from the tongue, thereby providing ample clearance above the tongue for the lateral swinging of the adjoining sections of shafting. In such an arrangement, when the shafting is transmitting torque through any considerable angle of inclination between the shaft sections, very destructive secondary loads will be imposed upon the bearing supporting brackets, alternating from one side to the other every 90 degrees of rotation and tending to wrench the bracket loose from its anchoring connection to the tongue. In view of the fact, however, that the prior hitch devices have been constructed with a multitude of joints and connections where vibration and rattling can develop, it appears that the seriousness of this problem has never been recognized.

This invention has as a very important object therefore to provide a hitch embodying a greatly improved arrangement for supporting the bearing that must absorb the pulsating secondary loads of the Cardan joint.

Another object of the invention is to provide a hitch which is greatly simplified and unified in construction as compared to the previously available hitches.

In the prior hitches, it has been considered necessary to make rather elaborate provision for covering and guarding the rotating line of shafting which is located at a height above the tongue, so as to protect both the shafting and the operator against accidental injury and minimize the fouling of the propeller shafting by straw, cornstalks, and the like. The present invention aims to completely eliminate the necessity for separate guard devices.

The foregoing objects are attained, in general, by providing an arrangement wherein the implement tongue constitutes a housing for the propeller shaft which extends unbrokenly from one end of the tongue to the other, and wherein the angular movement in the propeller shafting is provided for by a pair of Cardan joints, closely coupled in the form of a double joint which is roughly centered over the pivot between the implement tongue and the tractor draw bar.

Other objects, the advantages and uses of the invention will become more apparent after reading the following specification and claims, and after consideration of the drawing forming a part of the specification, wherein:

Fig. 1 is a longitudinal sectional view of a hitch embodying our invention with associated portions of a tractor and implement between which the hitch is connected;

Fig. 2 is a transverse sectional view of the same taken on the line 2—2 of Fig. 1; and Fig. 3 is a transverse sectional view of the same taken on the line 3—3 of Fig. 1.

As an example of one form in which the invention may be embodied, we have shown in the drawing a hitch including the tractor draw bar 10, an implement tongue 11 attached at its rear end to the gear casing 12 of the implement, and pivoted at 13 at its forward end to the draw bar 10, and a line of propeller shafting connecting the power take-off shaft 15 of the tractor to the power receiving shaft 16 of the implement.

The propeller shafting of the present invention comprises a single section of shafting 17 which extends the full length of the tongue 11 and is connected to the power take-off shaft 15 by means of a double Cardan joint indicated generally at 14. The joint 14 is substantially centered over the pivot 13 between the draw bar and tongue.

The joint 14 comprises a yoke 18 secured on the end of the power take-off shaft 15, a yoke 19 secured to the end of the propeller shaft 17, and a connecting double yoke 20, the respective ends of which are connected to the yokes 18 and 19 by means of conventional trunnion spiders 21 and 22 respectively. The double yoke 20 comprises a central web portion 23 and two pairs of spaced arms 24 extending in either direction therefrom. The yoke 18 comprises a split hub 25 clamped upon the take-off shaft 15 by means of a clamp screw 26, and a pair of spaced arms 27. The yoke 19 comprises a hub portion 28, keyed upon a reduced end portion 29 of the shaft 17, and a pair of spaced arms 30. The hub 28 is secured by a nut 31 threaded onto the end of the reduced shaft portion 29, and a washer 32 interposed between the nut 31 and the hub. The spiders 21 and 22 each have four trunnion arms terminating in trunnions journalled within bearings 33 mounted in the yoke arms 27, 24 and 30 respectively.

The shaft 17 has a main body portion in the form of a tube 34, and at one end has a solid trunnion portion 35 which terminates in the reduced portion 29. The trunnion portion 35 is formed with a shoulder 36 defining one extremity of a shank 37 which is pressed into the end of the tube 34 and secured thereto as by means of a rivet or pin 38. In the other end of the tube 34 is secured, as by welding at 39, the shank portion 40 of a squared socket 41 forming the rear end of the shaft 17. The socket 41 receives a square head 42 which is splined as at 43 on the end of the power receiving shaft 16 and secured thereon by a nut 44.

The head 42 of the power receiving shaft cooperates with the socket 41 to form a slip joint which permits axial telescoping of the shaft 16 in the shaft 17 and also permits a small amount of universal movement between the two shafts. Thus the slip joint eliminates the necessity for a conventional universal joint at this point in the propeller shafting.

The shafts 15 and 16 are supported in conventional bearings in the tractor and implement respectively. The forward end of the joint 14 is supported by the shaft 15. The rear end of the shaft 17 is supported by the shaft 16. The forward end of the shaft 17, and the rear end of the joint 14 are supported by a bearing 45 in which the trunnion 35 is journalled. The bearing 45 is supported in the forward end of the tongue 11 through the medium of integral lugs 46 which bear against the inner surface of the tongue 11 and which are axially slidable therein. The bearing 45 is held against rotation by a locating block 47 riveted at 48 to the wall of the tongue 11. The block 47 does not interfere with longitudinal sliding of the bearing 45. A bushing 49 may be employed to form the bearing surface in the bearing 45.

The yoke 19 is formed with a flange 50 which substantially closes the open end of the tongue 11 to exclude foreign matter and thus protect the bearing 45.

As the tongue 11 and shaft 17 swing away from their normal alignment with the take-off shaft 15, the shaft 17 will be moved rearwardly in the tongue 11, the socket 41 telescoping further over the head 42 and the bearing 45 moving further into the tongue 11 from the position shown in Figure 1. Correspondingly, the joint 14 will move rearwardly with respect to the pivot 13. In order to maintain an average centering of the joint 14 over the pivot 13, the center of the joint 14 may normally be located somewhat forwardly of the pivot 13 as shown in Figure 1, so that the rearward movement caused by swinging of the implement laterally may bring the center of the joint 14 closer to the pivot 13.

The rear end of the tongue 11 is socketed in a collar 51 protruding forwardly from the gear casing 12. The bearing engagement with the collar is restricted to a relatively narrow annular land 52 in the collar 51. This provides a limited amount of flexibility in the connection between the tongue and the implement, the limits of which are determined by engagement of the end of the tongue 11 with the wall of the collar 51.

The draft from the tongue 11 to the implement is transmitted through three or more draft rods 53 which are attached at their forward ends to a bracket 54 secured to the tongue 11, project upwardly and rearwardly therefrom, and are attached at their rear ends to the implement. The draft rods 53 also serve as supporting braces for maintaining the tongue 11 in a position in substantial alignment with the shaft 16.

Connection between the tongue 11 and the draw bar 10 is established through the medium of a tongue extension 55 which is secured at one end to the tongue 11 as by welding, and projects downwardly and forwardly therefrom so as to provide ample space below the joint 14 for the pivotal connection 13. The latter comprises a stud 56 secured in a block 57 in the lower end of the extension 55, and having a head 58 which is confined in a socket 59 on the end of the draw bar.

By confining the bearing 45 within the cylindrical wall of the tongue 11, we provide maximum security of support of the bearing 45 with respect to the tongue. This arrangement also makes it possible to associate the bearing with the propeller shaft in such a manner that the bearing and shaft may move axially as a unit within the tubular tongue.

By extending the propeller shaft through the tubular tongue 11, throughout its length, we obviate the necessity for any separate guard for the shaft. The tongue 11 forms a shield of maximum effectiveness, in addition to its function of transmitting draft.

If it is considered necessary to provide a guard over the joint 14, such guard need not be nearly as wide in order to cover the joint in all of its positions, as is necessary to cover the widely swinging shaft section of the prior hitches. Since the joint is confined to a region close to the rear end of the tractor, however, it is believed that it may be possible to dispense with the guard. The likelihood of corn stalks and the like becoming wedged between the rotating shaft and the draft tongue, which function was an important one in connection with the guard of the prior devices, is completely eliminated by sheathing the shaft within the tongue.

It is contemplated that the joint 14 may remain attached to the tractor when the implement is unhitched so that several types of implements may be hitched to the tractor, each utilizing the same joint. In order to detach the joint from the shaft 17, it is only necessary to remove the nut 31, allowing the hub 28 of the yoke 19 to be slipped off the trunnion 29. In prior hitches the entire line of propeller shafting remains a part of the implement assembly, and the cost of the joints is therefore duplicated in each implement.

We have provided a very compact hitch which eliminates a large amount of complicated shaft supporting mechanism and guard mechanism formerly required, provides a much more sturdy and durable support for the bearings to resist the destructive pulsating secondary loads developed in the rotation of the shaft sections out of alignment, provides greater protection for the rotating parts, and decreases the likelihood of fouling of these parts.

While we have described our invention in connection with one specific embodiment therein, it is to be understood that this is by way of illustration and not by way of limitation and the scope of our invention is defined solely by the appended claims which should be construed as broadly as the prior art will permit.

We claim:

1. A hitch for connecting a tractor having a rearwardly directed power take-off shaft to an agricultural implement having a forwardly directed power receiving shaft comprising a tubular tongue attached at one end to the implement coaxially with said power receiving shaft, and having at its other end a pivotal draft connection with the tractor, a propeller shaft housed in said tubular tongue and thereby protected against fouling, having at one end a longitudinally adjustable driving connection with said power receiving shaft and at its other end a universal drive connection with said power take-off shaft, and a bearing in which said other end of said propeller shaft is journalled, said bearing being supported in said tongue.

2. A hitch for connecting a tractor having a rearwardly directed power take-off shaft to a draft implement having a forwardly directed power receiving shaft, comprising a tubular tongue attached at one end to the implement coaxially with said power receiving shaft, and having at its other end a pivotal draft connection with the tractor, a propeller shaft housed in said tubular tongue, having at one end a slip joint driving connection with said power receiving shaft and at its other end a universal drive connection with said power take-off shaft, and a bearing in which said other end of said propeller shaft is journalled, said bearing being supported in and axially slidable in said tongue.

3. In a hitch for connecting a tractor having a rearwardly directed power take-off shaft and a draft implement having a forwardly directed power receiving shaft, a propeller shaft having at one end a slip joint driving connection with said power receiving shaft and at its other end a universal driving connection with said power take-off shaft, a bearing in which said other end of the shaft is journalled and supported, and a draft tongue attached at one end to said implement and having at its other end a pivotal draft connection with the tractor, said tongue being formed as a shield for said propeller shaft and having at its forward end a region embracing and supporting said bearing for axial movement relative to said tongue.

4. A hitch for connecting a tractor having a rearwardly directed power take-off shaft to a draft implement having a forwardly directed power receiving shaft, comprising a tubular tongue attached at its rear end to said implement and having at its forward end a draft extension projecting forwardly and downwardly, the tractor having a draw bar pivotally connected to the forward end of said extension, a propeller shaft extending through said tongue and having at its rear end a driving connection with said power receiving shaft and having at its forward end a universal driving connection with said power take-off shaft, and a bearing in which said forward end is journalled and supported, said bearing in turn being supported within the forward end of said tongue.

5. In a hitch for connecting a tractor having a rearwardly directed power take-off shaft and a draft implement having a forwardly directed power receiving shaft, a tubular tongue the rear end of which is socketed in a collar on said implement encircling said power receiving shaft, a combined draft bar and brace secured at its forward end to said tongue intermediate the ends thereof and projecting upwardly and rearwardly and attached to the implement, for supporting the tongue and transmitting draft from the tongue to the implement, said tongue at its forward end having a draft extension pivotally connected to the tractor at a point below and ahead of the forward end of the tongue, a propeller shaft having at its rear end a driving connection with said power receiving shaft and extending through said tongue, a bearing supporting the forward end of said shaft with reference to the tongue, and a universal joint connecting said forward end of the shaft to said power take-off shaft, said joint being substantially centered above said pivotal draft connection.

6. In a hitch for connecting a tractor having a rearwardly directed power take-off shaft and a draft implement having a forwardly directed power receiving shaft, said implement being formed with a collar surrounding said power receiving shaft, a tubular tongue the rear end of which is socketed in said collar for slight universal movement and the forward end of which is pivotally coupled to the tractor, a brace attached at its forward end to an intermediate region of said tongue, projecting upwardly and rearwardly, and attached at its other end to the implement, for supporting the tongue and transmitting draft therefrom to the implement, and a propeller shaft having at its rear end a driving connection with said power receiving shaft, extending through said tongue from one end to the other, and having at its forward end a universal driving connection with said power take-off shaft.

7. In a hitch for connecting a tractor having a rearwardly directed power take-off shaft and a draft implement having a forwardly directed power receiving shaft, a tubular draft tongue attached to said implement and having at its free end a pivotal draft connection with the tractor, a propeller shaft extending through said tongue and having at its rear end a slip joint driving connection with said power receiving shaft, a bearing in which the forward end of said propeller shaft is journalled, said bearing being formed with radially projecting lugs in axially slidable bearing engagement with the inner surface of said tongue, and a universal joint connecting said forward end of the propeller shaft to said power take-off shaft.

8. A hitch as defined in the preceding claim, including an axially disposed, inwardly extending projection in said tongue received between two of said lugs and restraining said bearing against rotation while allowing axial movement thereof.

9. In a hitch for connecting a tractor having a rearwardly directed power take-off shaft and an agricultural implement having a forwardly directed power receiving shaft, a propeller shaft formed at its rear end with a non-cylindrical socket, a head on said power receiving shaft received and fitted in said socket so as to form a slip joint driving connection between said power receiving shaft and said propeller shaft, a universal joint connecting the forward end of said propeller shaft to said power take-off shaft, and a draft tongue parallel to and closely associated with said propeller shaft so as to constitute a shield therefor to protect the same against fouling, said tongue being attached to said implement and having at its forward end a pivotal draft connection with said tractor on a center radially spaced from the longitudinal axis of said universal joint.

10. In a hitch for connecting a tractor having a rearwardly directed power take-off shaft and a draft implement having a forwardly directed power receiving shaft, a propeller tube formed at its rear end with a non-cylindrical socket, a head on said power receiving shaft received and fitted in said socket so as to form a slip joint driving connection between said power receiving shaft and said propeller shaft, a double Cardan universal joint connecting the forward end of said propeller shaft to said power take-off shaft, and a draft tongue parallel to and closely associated with said propeller shaft so as to constitute a shield therefor, said tongue being attached to said implement and having at its forward end a pivotal draft connection with said tractor.

11. A hitch as defined in claim 10, including a bearing in which the forward end of said propeller shaft is journalled, said bearing being embraced and supported by the forward region of said tongue.

12. In a hitch for connecting a tractor having a rearwardly directed power takeoff shaft to an implement having a forwardly directed power-receiving shaft, a tongue attached at one end to the implement and pivotally coupled at its other end to the tractor, a propeller shaft having at one end a slip joint driving connection with said power receiving shaft and at its other end a universal coupling with said power takeoff shaft, and a bearing in which the said other end of said propeller shaft is journalled, said bearing being supported by and axially slidable with reference to said tongue and said tongue being formed as a guard for said propeller shaft.

13. A hitch for connecting a tractor having a rearwardly directed power takeoff shaft to a draft implement having a forwardly directed power receiving shaft, comprising a tongue attached at one end to the implement and having at its other end a pivotal draft connection with the tractor, a propeller shaft having at one end a driving connection with said power receiving shaft and at its other end a universal drive connection with said power takeoff shaft, and a bearing in which said other end of said propeller shaft is journalled, said bearing being supported by and axially slidable with reference to said tongue, said tongue being formed as a shield for said propeller shaft.

14. A hitch for connecting a tractor having a rearwardly directed power take-off shaft to an agricultural implement having a forwardly directed power receiving shaft, comprising a tongue attached at its rear end to said implement and having at its forward end a draft extension which is offset radially with reference to the longitudinal axis of the tongue, the tractor having a draw bar pivotally connected to the forward end of said extension, a propeller shaft having at its rear end a driving connection with said power receiving shaft and having at its forward end a universal driving connection with said power takeoff shaft, and a bearing in which said forward end is journalled and supported, said bearing in turn being supported by the forward end of said tongue and said tongue being formed as a shield for said propeller shaft for shielding it against fouling.

15. A hitch as defined in claim 14, wherein said universal driving connection is substantially centered longitudinally with reference to said pivotal draft connection.

16. In a hitch for connecting a tractor having a rearwardly directed power takeoff shaft and an agricultural implement having a forwardly directed power receiving shaft, a tongue the rear end of which has a draft connection with said draft implement and the forward end of which is pivotally coupled to the tractor, a brace attached at its forward end to an intermediate region of said tongue, projecting upwardly and rearwardly and attached at its rear end to the implement, for supporting the tongue and transmitting draft therefrom to the implement, and a propeller shaft having at its rear end a driving connection with said power receiving shaft, and at its forward end a universal driving connection with said power takeoff shaft, said tongue being formed as a shield for said propeller shaft for protecting it against damage and shielding it against fouling.

17. In a tractor hitch, a combined draft tongue and propeller shaft shield, a propeller shaft shielded by said tongue, a bearing in which said shaft is journalled, said bearing being formed with radially projecting lugs, said tongue having a tubular portion in which said lugs are received for axially slidable movement, said tubular portion being provided with an inwardly extending projection received between two of said lugs and restraining said bearing against rotation while allowing axial movement thereof.

CARL E. SWENSON.
FRED M. POTGIETER.